(12) United States Patent
Akita

(10) Patent No.: US 10,190,514 B2
(45) Date of Patent: Jan. 29, 2019

(54) PURGE DEVICE, AND INTERNAL COMBUSTION ENGINE PROVIDED WITH THE SAME

(71) Applicant: TOYOTA JIDOSHA KABUSHIKI KAISHA, Toyota-shi, Aichi-ken (JP)

(72) Inventor: Tatsuhiko Akita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/422,781

(22) Filed: Feb. 2, 2017

(65) Prior Publication Data

US 2017/0226939 A1 Aug. 10, 2017

(30) Foreign Application Priority Data

Feb. 4, 2016 (JP) ................. 2016-019679

(51) Int. Cl.
*F02D 41/00* (2006.01)
*F02M 25/08* (2006.01)
(Continued)

(52) U.S. Cl.
CPC ........... *F02D 41/004* (2013.01); *B01D 53/02* (2013.01); *B01D 53/0415* (2013.01);
(Continued)

(58) Field of Classification Search
CPC .. F02D 41/004; F02D 41/0032; F02D 41/003; F02D 41/0037; F02D 41/0045; F02D 19/025; F02D 19/0623; F02M 25/0854; F02M 25/0836; F02M 25/0872; F02M 25/0809; F02M 25/0818; F02M 25/08; F02B 33/00; B01D 53/02; B01D 2253/102; B01D 2259/4516
See application file for complete search history.

(56) References Cited

U.S. PATENT DOCUMENTS

2014/0196694 A1* 7/2014 Euliss ................. F02M 25/08
123/520
2014/0251284 A1* 9/2014 Plymale ............... F02M 25/089
123/518

(Continued)

FOREIGN PATENT DOCUMENTS

JP 2006-348901 A 12/2006
JP 2015-175234 A 10/2015

*Primary Examiner* — Lindsay Low
*Assistant Examiner* — George Jin
(74) *Attorney, Agent, or Firm* — Oliff PLC (57) ABSTRACT

A purge device includes a canister; a purge passage configured to extend from the canister and be connected to an upstream side of a compressor of a supercharger in an intake passage; a supply unit configured to supply purge gas to the upstream side of the compressor in the intake passage during supercharging; a throttle configured to be provided in a portion of the intake passage connected with the purge passage and limit an inflow of gas from the purge passage; a sensor configured to detect internal pressure downstream of the supply unit in the purge passage; and a control device configured to determine that a passage end of the purge passage deviates from the intake passage, in a case where a detection value obtained by the sensor during the operation of the supply unit is lower than a predetermined pressure.

7 Claims, 3 Drawing Sheets

(51) Int. Cl.
*B01D 53/02* (2006.01)
*F02B 33/00* (2006.01)
*B01D 53/04* (2006.01)

(52) U.S. Cl.
CPC .......... *F02B 33/00* (2013.01); *F02D 41/0037* (2013.01); *F02M 25/089* (2013.01); *F02M 25/0809* (2013.01); *F02M 25/0836* (2013.01); *F02M 25/0854* (2013.01); *F02M 25/0872* (2013.01); *B01D 2253/102* (2013.01); *B01D 2259/4516* (2013.01); *F02D 41/003* (2013.01); *F02D 41/0007* (2013.01)

(56) References Cited

U.S. PATENT DOCUMENTS

| | | | |
|---|---|---|---|
| 2016/0069304 A1* | 3/2016 | Guidi | F02M 25/0809 123/518 |
| 2016/0186694 A1* | 6/2016 | Wakamatsu | F02M 25/08 123/519 |
| 2016/0305352 A1* | 10/2016 | Pursifull | F02M 35/104 |

* cited by examiner

PURGE DEVICE, AND INTERNAL COMBUSTION ENGINE PROVIDED WITH THE SAME

INCORPORATION BY REFERENCE

The disclosure of Japanese Patent Application No. 2016-019679 filed on Feb. 4, 2016 including the specification, drawings and abstract is incorporated herein by reference in its entirety.

BACKGROUND

1. Technical Field

The present disclosure relates to a purge device that traps evaporated fuel generated within a fuel tank in a canister and introduces purge gas including the trapped evaporated fuel into an intake passage of an internal combustion engine from the canister, and an internal combustion engine provided with the same.

2. Description of Related Art

As internal combustion engines to be mounted on automobiles or the like, there are ones including a purge device that traps evaporated fuel generated within a fuel tank in a canister and introduces (purges) purge gas including the trapped evaporated fuel into an intake passage from the canister. In the internal combustion engines having such a purge device, by introducing the purge gas into the intake passage during engine operation, the evaporated fuel desorbed from the inside of the canister is combusted in a combustion chamber of an internal combustion engine such that the trap capacity of the evaporated fuel by the canister is recovered.

Additionally, a purge device described in Japanese Patent Application Publication No. 2006-348901 (JP 2006-348901 A) includes a purge passage that is mounted on an internal combustion engine having a supercharger and is connected to an upstream side of a compressor in the intake passage from the canister. In the purge device described in JP 2006-348901 A, when supercharging using the compressor is performed, the purge gas is introduced into the intake passage via a purge passage, using negative pressure generated upstream of the compressor.

SUMMARY

Meanwhile, in this purge device, a passage end of the purge passage connected the intake passage may deviate from the intake passage, and it is necessary to suitably detect such deviation of the passage end of the purge passage. However, in the purge passage that introduces the purge gas into the intake passage upstream of the compressor during supercharging, a change in pressure within the purge passage in a case where the passage end is connected to the intake passage and in a case where the passage end deviates from the intake passage is small, and it is difficult to detect the deviation of the passage end.

The disclosure provides a purge device and an internal combustion engine provided with the same that can suitably detect that a passage end of a purge passage connected to an upstream side of a compressor in an intake passage deviates from the intake passage.

A purge device related to a first aspect of the disclosure is a purge device mounted on an internal combustion engine including a supercharger. The purge device includes a canister configured to trap evaporated fuel generated in a fuel tank; a purge passage configured to extend from the canister and be connected to an upstream side of a compressor of the supercharger in an intake passage of the internal combustion engine; a supply unit configured to supply purge gas within the purge passage to the upstream side of the compressor in the intake passage during supercharging using the supercharger; a throttle configured to be provided in a portion of the intake passage connected with the purge passage and limit an inflow of gas from the purge passage; a sensor configured to detect internal pressure downstream of the supply unit in the purge passage; and a control device configured to determine that a passage end of the purge passage connected to the intake passage deviates from the intake passage, in a case where a detection value obtained by the sensor during the operation of the supply unit is lower than a predetermined pressure.

In a case where the passage end of the purge passage does not deviate from the intake passage, the inflow of the gas from the purge passage to the intake passage is limited by the throttle provided in the intake passage during the operation of the supply unit. Therefore, the internal pressure downstream of the supply unit in the purge passage becomes a high pressure to some extent. On the other end, in a case where the passage end of the purge passage deviates from the intake passage, the passage end of the purge passage deviates from the throttle provided in the intake passage. Therefore, the internal pressure downstream of the supply unit in the purge passage becomes a low pressure equivalent to the atmospheric pressure during the operation of the supply unit.

Thus, in the above configuration, in a case where the detection value obtained by the above sensor during the operation of the supply unit is lower than the predetermined pressure, it is determined that the passage end of the purge passage deviates from the intake passage. For this reason, in a case where it is detected that the detection value is lower than the predetermined pressure in a state where the detection value obtained by the sensor should become equal to or higher than the predetermined pressure if the deviation of the passage end of the purge passage does not occur, it can be determined on the basis of the result that the deviation of the passage end of the purge passage occurs.

In this way, according to the above configuration, it is possible to suitably detect that the passage end of the purge passage connected to the upstream side of the compressor in the intake passage deviates from the intake passage. Additionally, in the above aspect, the supply unit may be an ejector that is provided in the middle of the purge passage and takes in pressurized gas from a downstream side of the compressor in the intake passage to circulate the pressurized gas to the upstream side of the compressor through the purge passage, and supplies the gas within the purge passage to the upstream side of the compressor in the intake passage using the intensity of the gas, and the predetermined pressure may be set to a higher pressure as the supercharge pressure of the supercharger is a higher pressure.

In a case where the passage end of the purge passage does not deviate from the intake passage, the supercharge pressure of the supercharger is a high pressure, and the internal pressure downstream of the ejector in the purge passage becomes a higher pressure as the pressure of the gas circulating through the ejector is higher.

Thus, in the above configuration, the predetermined pressure that is a threshold value for determining that the passage end of the purge passage deviates from the intake passage is set to a higher pressure as the supercharge pressure of the supercharger is a higher pressure. For this reason, the determination on whether or not the passage end of the purge passage deviates from the intake passage can be performed using a suitable threshold value according to the supercharge pressure.

Additionally, in the above aspect, the supply unit may be a purge pump provided in the middle of the purge passage, and the predetermined pressure may be set to a higher pressure as the discharge amount of the purge pump is larger.

In a case where the passage end of the purge passage does not deviate from the intake passage, the internal pressure downstream of the purge pump in the purge passage becomes a higher pressure as the discharge amount of a purge pump is larger. Thus, in the above configuration, the predetermined pressure that is a threshold value for determining that the passage end of the purge passage deviates from the intake passage is set to a higher pressure as the discharge amount of the purge pump is larger. For this reason, the determination on whether or not the passage end of the purge passage deviates from the intake passage can be performed using a suitable threshold value according to the discharge amount of the purge pump.

Additionally, in the above configuration, the purge device may further include a flow rate adjusting valve provided downstream of the purge pump in the purge passage and upstream a site where the sensor is provided, and the predetermined pressure may be set to a higher pressure as the opening degree of the flow rate adjusting valve is larger.

In a case where the passage end of the purge passage does not deviate from the intake passage, the internal pressure downstream of the flow rate adjusting valve in the purge passage during the operation of the purge pump becomes a higher pressure as the opening degree of the flow rate adjusting valve is larger.

Thus, in the above configuration, the predetermined pressure that is a threshold value for determining that the passage end of the purge passage deviates from the intake passage is set to a higher pressure as the opening degree of the flow rate adjusting valve is larger. For this reason, the determination on whether or not the passage end of the purge passage deviates from the intake passage can be performed using a suitable threshold value according to the opening degree of the flow rate adjusting valve.

An internal combustion engine related to a second aspect of the disclosure includes a supercharger; a purge device including a canister configured to trap evaporated fuel generated in a fuel tank, a purge passage configured to extend from the canister and be connected to an upstream side of a compressor of the supercharger in an intake passage of the internal combustion engine, a supply unit configured to supply purge gas within the purge passage to the upstream side of the compressor in the intake passage during supercharging using the supercharger, a throttle configured to be provided in a portion of the intake passage connected with the purge passage and limit an inflow of gas from the purge passage, and a sensor configured to detect internal pressure downstream of the supply unit in the purge passage; and a control device configured to determine that a passage end of the purge passage connected to the intake passage deviates from the intake passage, in a case where a detection value obtained by the sensor during the operation of the supply unit is lower than a predetermined pressure.

According to the second above aspect, the same effects as the above first aspect can be obtained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
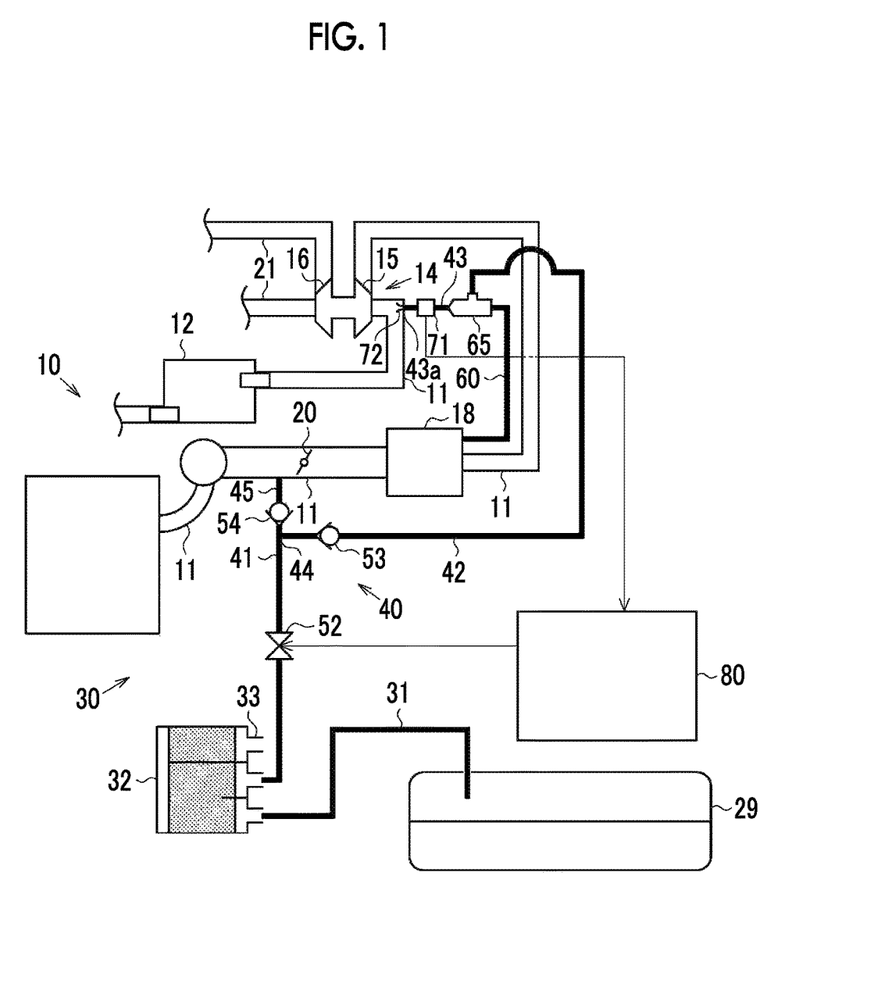
FIG. 1 is a schematic view illustrating a purge device that is a first embodiment, and an internal combustion engine on which this purge device is mounted.

Hereinafter, a first embodiment of a purge device will be described with reference to FIGS. 1 to 3. As illustrated in FIG. 1, an air cleaner 12, a compressor 15 of a supercharger 14, an intercooler 18, and a throttle valve 20 are provided sequentially from an intake upstream side in an intake passage 11 of an internal combustion engine 10 mounted with a purge device 30. An exhaust passage 21 of the internal combustion engine 10 is provided with a turbine 16 of the supercharger 14.

The purge device 30 includes a canister 32 provided with adsorbent, such as activated carbon, which traps evaporated fuel generated in a fuel tank 29, and a purge passage 40 that allows purge gas including the evaporated fuel trapped in the canister 32 to be introduced into the intake passage 11 therethrough. The fuel tank 29 and the canister 32 are connected together via a passage 31.

The purge passage 40 extends from the canister 32, and is connected to an upstream side of the compressor 15 in the intake passage 11. Additionally, a branch passage 45 is connected in the middle of the purge passage 40. The branch passage 45 is connected to a downstream side of the throttle valve 20 in the intake passage 11. An ejector 65 is provided downstream of a branch place 44, which branches from the branch passage 45, in the middle of the purge passage 40. That is, the purge passage 40 consists of a first passage 41 from the canister 32 to the branch place 44, a second passage 42 from the branch place 44 to the ejector 65, and a third passage 43 from the ejector 65 to a portion connected with the intake passage 11.

A flow rate adjusting valve 52 of which the opening degree is controlled in order to adjust the flow rate of the purge gas that flows into the second passage 42 or the branch passage 45 from the first passage 41 is provided in the middle of the first passage 41. The second passage 42 is provided with a one-way valve 53 that allows only the flow of the purge gas that runs from the branch place 44 to the ejector 65 and does not allow a flow in its reverse direction. Additionally, the branch passage 45 is also similarly provided with a one-way valve 54 that allows only the flow of the purge gas that runs from the branch place 44 to the place connected with the intake passage 11 and does not allow the flow in its reverse direction.

An inflow passage 60 connected to the intercooler 18 is connected to the ejector 65. In addition to the inflow passage 60, the second passage 42 and the third passage 43 are open to the inside of the ejector 65.

The third passage 43 is provided with an internal pressure sensor 71 that detects an internal pressure P of the third passage 43 that is internal pressure downstream of the ejector 65 in the purge passage 40. Additionally, the portion of the intake passage 11 connected with the third passage 43 is provided with a throttle 72 that limits an inflow of gas from the third passage 43. The throttle 72 is formed integrally with the intake passage 11 in the portion of the intake passage 11 connected with the third passage 43.

In the purge device 30, driving of the flow rate adjusting valve 52 is controlled by a control device 80. That is, the purge device 30 is configured in an aspect including the control device 80 that controls the flow rate adjusting valve 52. In addition, the purge device 30 may not be configured in the aspect including the control device 80. In addition, the control device 80 serves also as a control device that executes various kinds of engine operation control of the internal combustion engine 10. The control device 80 is provided with a CPU that executes various kinds of calculation processing related to the various kinds of operation control of the internal combustion engine 10 including the control of the flow rate adjusting valve 52. Additionally, the control device 80 is provided with a ROM in which programs or data required for the various kinds of operation control are stored, a RAM in which calculation results of the CPU are temporarily stored, and the like. The above flow rate adjusting valve 52, and the like are connected to the control device 80.

Various sensors, such as the internal pressure sensor 71, are connected to the control device 80. The control device 80 ascertains engine operational states, such as an engine speed and an engine load, on the basis of signals from the connected various sensors. Then, the flow rate adjusting valve 52 and the like is controlled on the basis of the ascertained engine operational states. The various kinds of engine operation control, such as opening/closing control of a waste gate valve, including the flow rate control of the purge gas introduced into the intake passage 11 in this way, are carried out through the control device 80.

The flow rate adjusting valve 52 is brought into a valve-closed state during the operation stop of the internal combustion engine 10. An air-fuel mixture of the evaporated fuel generated within the fuel tank 29 with air is introduced into the canister 32 through the passage 31. The evaporated fuel in the air-fuel mixture introduced into the canister 32 is trapped by the adsorbent of the canister 32, and the air after the evaporated fuel is removed from the air-fuel mixture is released to the outside of the canister 32 from an ambient air communication passage 33 of the canister 32.

On the other hand, during the operation of the internal combustion engine 10, the flow rate adjusting valve 52 is brought into a valve-open state on the condition that purge execution conditions, like learning of an air-fuel-ratio feedback correction coefficient is completed regarding a plurality of learning regions of the internal combustion engine 10, are satisfied. Specifically, the opening degree of the flow rate adjusting valve 52, is controlled by the duty of an exciting current of the adjusting valve being controlled by the control device 80. By bringing the flow rate adjusting valve 52 into the valve-open state in this way, the evaporated fuel is desorbed from the adsorbent of the canister 32 with the air that has flowed into the canister 32 via the ambient air communication passage 33, and the purge gas including this desorbed evaporated fuel is introduced into the intake passage 11.

In addition, circulation routes for the purge gas are different from each other depending on whether or not supercharging using the supercharger 14 is performed. During the supercharging using the supercharger 14, the purge gas is introduced into the intake passage 11 via the purge passage 40. During such supercharging using the supercharger 14, the pressure downstream of the compressor 15 in the intake passage 11 becomes high. As a result, a difference is caused in the pressure inside the intake passage 11 upstream and downstream of the compressor 15 in the intake passage 11. If such a pressure difference becomes large, the pressurized gas downstream of the compressor 15 in the intake passage 11 flows into the inflow passage 60 from the intercooler 18, and the gas that has flowed into the inflow passage 60 is taken into the ejector 65. The gas taken into the ejector 65 is circulated to the upstream side of the compressor 15 in the intake passage 11 through the third passage 43. Then, the intensity of the gas that flows through the inflow passage 60 and the third passage 43 acts on the ejector 65, and a negative pressure is generated in an internal space of the ejector 65. If the negative pressure is generated in the internal space of the ejector 65, the purge gas is sucked into the ejector 65 from the second passage 42. Then, the purge gas sucked by the ejector 65 is introduced into the intake passage 11 via the third passage 43, in conjunction with the gas that has flowed in from the inflow passage 60. In addition, in the present embodiment, the ejector 65 is an example of a supply unit for supplying the purge gas within the purge passage 40 to the upstream side of the compressor 15 in the intake passage 11 during the supercharging using the supercharger 14. Then, the ejector 65 that is a supply unit operates during the supercharging.

Additionally, when the supercharging using the supercharger 14 is not performed, the purge gas is introduced into the intake passage 11 via the first passage 41 and the branch passage 45 by using the negative pressure generated downstream of the throttle valve 20.

Then, the evaporated fuel in the purge gas introduced into the intake passage 11 is processed by being combusted within a combustion chamber of the internal combustion engine 10. Additionally, the control device 80 of the purge device 30 performs the determination processing of determining whether or not a passage end of the purge passage 40 connected to the intake passage 11, that is, a passage end 43a of the third passage 43 deviates from the intake passage 11. This determination processing is repeatedly executed in a predetermined cycle during engine operation.

Figure 2:
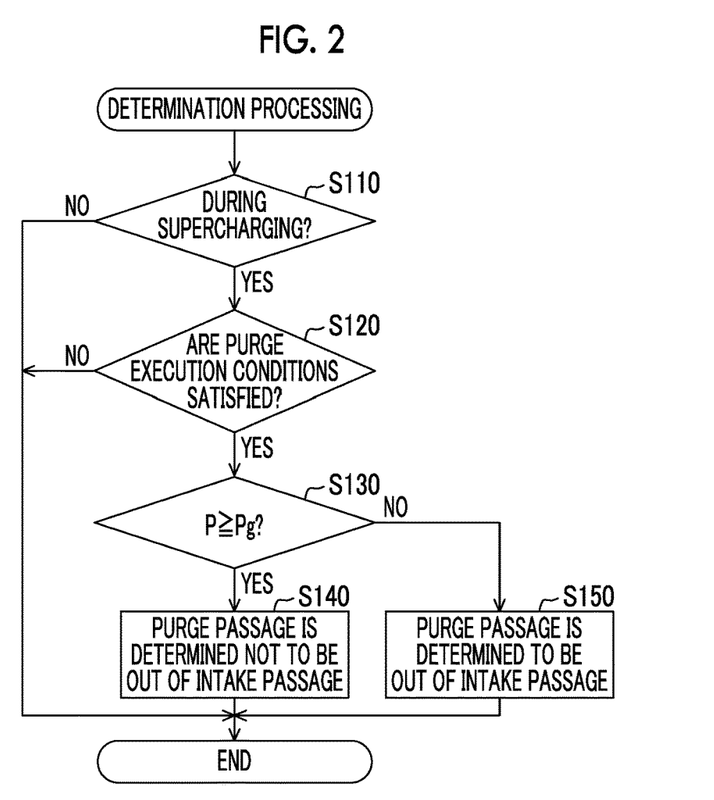
FIG. 2 is a flowchart illustrating an execution order of determination processing that a control device related to this embodiment executes.

As illustrated in FIG. 2, if this determination processing is started, it is first determined whether or not the supercharging using the supercharger 14 is being performed (Step S110). In addition, whether or not the supercharging is being performed can be determined according to, for example, whether or not the waste gate valve is closed. That is, when the waste gate valve is open, this valve allows exhaust gas to flow therethrough bypassing the turbine 16. Therefore, it can be determined that the supercharging is not being performed. When the waste gate valve is closed, the exhaust gas passes through the turbine 16. Therefore, it can be determined that the supercharging is being performed. If it is determined that the supercharging is being performed (Step S110: YES), it is determined whether or not the above purge execution conditions are satisfied (Step S120). On the other hand, if it is determined that the supercharging is not being performed (Step S110: NO), this processing is first ended. Additionally, even in a case where it is determined that the above purge execution conditions are not satisfied (Step S120: NO), this processing is first ended.

If it is determined that the above purge execution conditions are satisfied (Step S120: YES), it is determined whether or not the internal pressure P of the third passage 43 that is a detection value obtained by the internal pressure sensor 71 is equal to or higher than a predetermined pressure Pg (Step S130). The predetermined pressure Pg is set to a higher pressure as the supercharge pressure of the supercharger 14 is a higher pressure. If the internal pressure P of the third passage 43 is determined to be equal to or higher than the predetermined pressure Pg (Step S130: YES), it is determined that the passage end 43a of the third passage 43 does not deviate from the intake passage 11 (Step S140). On the other hand, if the internal pressure P of the third passage 43 is determined to be lower than the predetermined pressure Pg (Step S130: NO), it is determined that the passage end 43a of the third passage 43 deviates from the intake passage 11 (Step S150). If it is determined that the passage end 43a of the third passage 43 deviates from the intake passage 11 in this way, lighting or the like of an alarm lamp is performed, thereby notifying a driver of an event that the purge passage 40 deviates from the intake passage 11. Then, if the processing of either Step S140 or Step S150 is performed, this processing is first ended.

Next, the working of the present embodiment will be described. In a case where the passage end 43a of the third passage 43 does not deviate from the intake passage 11, the inflow of the gas from the purge passage 40 to the intake passage 11 is limited by the throttle 72 provided in the intake passage 11 during the operation of the ejector 65 that is the supply unit. Therefore, the internal pressure P of the third passage 43 becomes a high pressure to some extent. On the other hand, in a case where the passage end 43a of the third passage 43 deviates from the intake passage 11, the passage end 43a of the third passage 43 deviates from the throttle 72 provided in the intake passage 11. Therefore, even during the operation of the ejector 65, the internal pressure P of the third passage 43 becomes a low pressure equivalent to the atmospheric pressure.

Thus, in the present embodiment, in a case where the supercharging is being performed (Step S110: YES) and the internal pressure P of the third passage 43 when the ejector 65 is operating is lower than the predetermined pressure Pg, it is determined that the passage end 43a of the third passage 43 deviates from the intake passage 11. For this reason, in a case where the internal pressure sensor 71 has detected that the internal pressure P of the third passage 43 is lower than the predetermined pressure Pg in a state where the internal pressure P of the third passage 43 should become equal to or higher than the predetermined pressure Pg if the deviation of the passage end 43a of the third passage 43 does not occur, it can be determined on the basis of the result that the deviation of the passage end 43a of the third passage 43 occurs.

Figure 3:
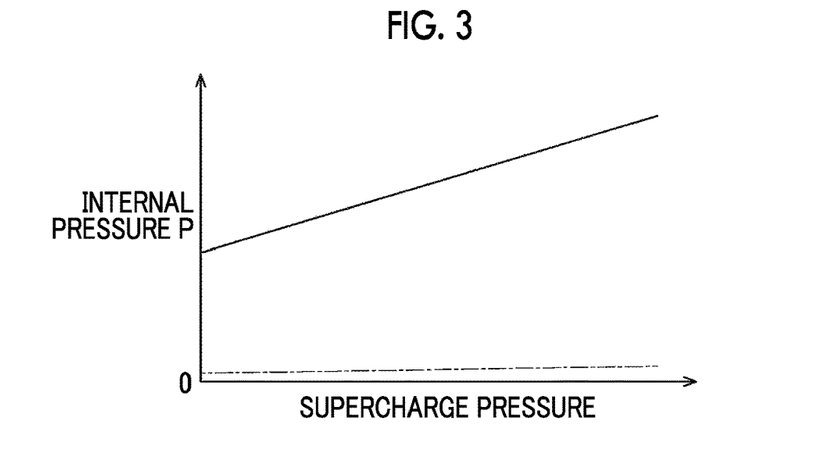
FIG. 3 is a view illustrating a relationship between supercharge pressure and the internal pressure of a third passage.

As illustrated by one-dot chain line in FIG. 3, in a case where the passage end 43a of the third passage 43 deviates from the intake passage 11, the internal pressure P of the third passage 43 according to the supercharge pressure of the supercharger 14 becomes a low pressure as compared to a case where the passage end 43a of the third passage 43 illustrated by a solid line in FIG. 3 does not deviate from the intake passage 11.

In addition, in a case where the passage end 43a of the third passage 43 does not deviate from the intake passage 11, the supercharge pressure of the supercharger 14 is a high pressure, and the internal pressure P of the third passage 43 becomes a higher pressure as the pressure of the gas circulating through the ejector 65 is higher. On the other hand, in a case where the passage end 43a of the third passage 43 illustrated in FIG. 3 deviates from the intake passage 11, the internal pressure P of the third passage 43 hardly fluctuates even if the supercharge pressure of the supercharger 14 fluctuates. However, the degree of a rise in the internal pressure P according to a rise in the supercharge pressure of the supercharger 14 becomes larger as the passage cross-sectional area of the purge passage 40 including the third passage 43 is smaller. In the present embodiment, in order to consider such fluctuation of the internal pressure P of the third passage 43 according to the supercharge pressure of the supercharger 14 to determine deviation of the purge passage 40 from the intake passage 11, the predetermined pressure Pg that is a threshold value for determining that the passage end 43a of the third passage 43 deviates from the intake passage 11 is set to a higher pressure as the supercharge pressure of the supercharger 14 is a higher pressure. Hence, the determination on whether or not the passage end 43a of the third passage 43 deviates from the intake passage 11 can be performed using a suitable threshold value according to the supercharge pressure.

According to the above-described purge device 30, the following effects can be performed. It is possible to suitably detect that the passage end 43a of the third passage 43 connected to the upstream side of the compressor 15 in the intake passage 11 deviates from the intake passage 11.

Next, a second embodiment of the purge device will be described with reference to FIG. 4. In the following, differences from the first embodiment will mainly be described.

Figure 4:
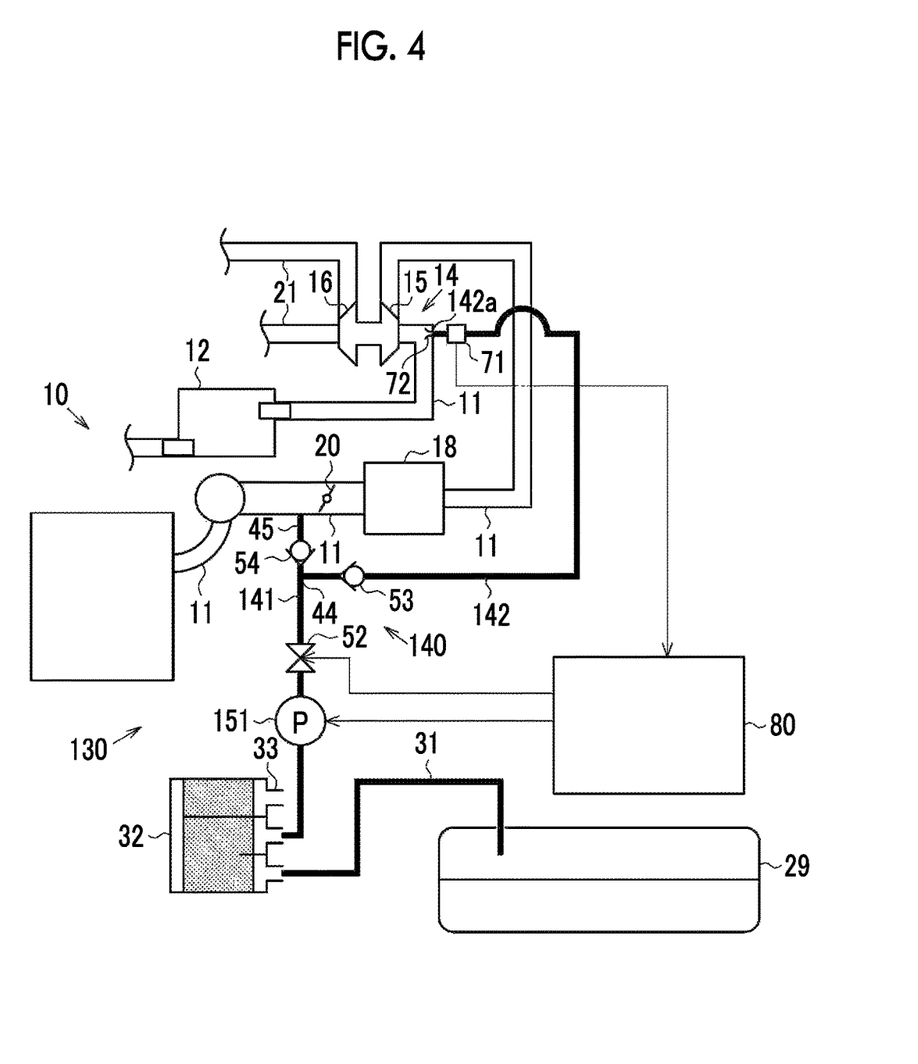
FIG. 4 is a schematic view illustrating a purge device that is a second embodiment, and an internal combustion engine on which this purge device is mounted.

As illustrated in FIG. 4, a purge passage 140 of a purge device 130 in the second embodiment is constituted with a first passage 141 from the canister 32 to the branch place 44 that branches from the branch passage 45, and a second passage 142 from the branch place 44 to the portion connected with the intake passage 11. A purge pump 151 is provided upstream of the flow rate adjusting valve 52 in the middle of the first passage 141. In addition, in the present embodiment, the purge pump 151 is an example of a supply unit for supplying the purge gas within the purge passage 140 to the upstream side of the compressor 15 in the intake passage 11 during the supercharging using the supercharger 14.

Additionally, the second passage 142 is provided with the internal pressure sensor 71 that detects an internal pressure P of the second passage 142 that is internal pressure downstream of the purge pump 151 in the purge passage 140. That is, the flow rate adjusting valve 52 is provided downstream of the purge pump 151 in the purge passage 140 and upstream of a site where the internal pressure sensor 71 is provided.

Additionally, the portion of the intake passage 11 connected with the second passage 142 is provided with the throttle 72 that limits an inflow of gas from the second passage 142. The throttle 72 is formed integrally with the intake passage 11 in the portion of the intake passage 11 connected with the second passage 142.

Driving of the purge pump 151 and the flow rate adjusting valve 52 is controlled by the control device 80. That is, the purge device 130 is configured in an aspect including the control device 80 that controls the purge pump 151 and the flow rate adjusting valve 52. In addition, the purge device 130 may not be configured in the aspect including the control device 80.

During the operation stop of the internal combustion engine 10, the flow rate adjusting valve 52 is brought into the valve-closed state and the driving of the purge pump 151 is stopped. On the other hand, during the operation of the internal combustion engine 10, the flow rate adjusting valve 52 is brought into the valve-open state and the driving of the purge pump 151 is started, on the condition that the purge execution conditions are satisfied. Specifically, the opening degree of the flow rate adjusting valve 52, is controlled by the control device 80 similar to the first embodiment, and the discharge amount of the purge pump 151 is controlled by the control device 80. By bringing the flow rate adjusting valve 52 into the valve-open state in this way and driving the purge pump 151, the evaporated fuel is desorbed from the adsorbent of the canister 32 with the air that has flowed into the canister 32 via the ambient air communication passage 33, and the purge gas including this desorbed evaporated fuel is introduced into the intake passage 11.

In addition, also in the present embodiment, circulation routes for the purge gas are different from each other depending on whether or not the supercharging using the supercharger 14 is performed. During the supercharging using the supercharger 14, the purge gas is introduced into the intake passage 11 via the purge passage 140. As described above, during such supercharging using the supercharger 14, the pressure downstream of the compressor 15 in the intake passage 11 becomes high. For that reason, even if the flow rate adjusting valve 52 is brought into the valve-open state and the purge pump 151 is driven, the one-way valve 54 is closed, and the purge gas is not introduced from the branch passage 45. On the other hand, since the pressure upstream of the compressor 15 in the intake passage 11 is equivalent to the atmospheric pressure even if the supercharging is being performed, the one-way valve 53 is open and the purge gas is introduced into the intake passage 11 via the second passage 142. In addition, in the present embodiment, the purge pump 151 is the example of the supply unit for supplying the purge gas within the purge passage 140 to the upstream side of the compressor 15 in the intake passage 11 during the supercharging using the supercharger 14.

Additionally, when the supercharging using the supercharger 14 is not performed, the negative pressure is generated downstream of the throttle valve 20. Therefore, the one-way valve 54 is open, and the purge gas is introduced into the intake passage 11 via the first passage 141 and the branch passage 45.

Then, the control device 80 of the purge device 130 performs the determination processing of determining whether or not a passage end of the purge passage 140 connected to the intake passage 11, that is, a passage end 142a of the second passage 142 deviates from the intake passage 11. This determination processing is repeatedly executed in a predetermined cycle during engine operation. Additionally, in the determination processing of the present embodiment, it is determined in the processing of Step S130 illustrated in FIG. 2 whether or not the internal pressure P of the second passage 142 that is a detection value obtained by the internal pressure sensor 71 is equal to or higher than the predetermined pressure Pg. The predetermined pressure Pg is set to a higher pressure as the discharge amount of the purge pump 151 is larger, and is set to a higher pressure as the opening degree of the flow rate adjusting valve 52 is larger. Regarding the other processing procedure, the determination processing in the present embodiment is the same as the determination processing of the first embodiment illustrated in FIG. 2.

Next, the working of the present embodiment will be described. When the supercharging is being performed (Step S110: YES), the purge execution conditions are satisfied (Step S120: YES), and the flow rate adjusting valve 52 is brought into the valve-open state and when the purge pump 151 is operating, the purge gas is introduced into the intake passage 11 through the purge passage 140. In this case, in a case where the passage end 142a of the second passage 142 does not deviate from the intake passage 11, the inflow of the gas from the purge passage 40 to the intake passage 11 is limited by the throttle 72 provided in the intake passage 11. Therefore, the internal pressure P of the second passage 142 becomes a high pressure to some extent. On the other hand, in a case where the passage end 142a of the second passage 142 deviates from the intake passage 11, the passage end 142a of the second passage 142 deviates from the throttle 72 provided in the intake passage 11. Therefore, even during the operation of the purge pump 151, the internal pressure P of the second passage 142 becomes a low pressure equivalent to the atmospheric pressure.

Thus, in the present embodiment, in a case where the supercharging is being performed (Step S110: YES), the purge execution conditions are satisfied (Step S120: YES), and the internal pressure P of the second passage 142 when the purge pump 151 is operating is lower than the predetermined pressure Pg, it is determined that the passage end 142a of the second passage 142 deviates from the intake passage 11. For this reason, in a case where the internal pressure sensor 71 has detected that the internal pressure P of the second passage 142 is lower than the predetermined pressure Pg in a state where the internal pressure P of the second passage 142 should become equal to or higher than the predetermined pressure Pg if the deviation of the passage end 142a of the second passage 142 does not occur, it can be determined on the basis of the result that the deviation of the passage end 142a of the second passage 142 occurs. That is, the same effects as the effects that can be obtained in the first embodiment can be obtained.

Additionally, according to the above-described purge device 130, the following working effects can be exhibited in addition to the effects that can be obtained in the above-described first embodiment. In a case where the passage end 142a of the second passage 142 does not deviate from the intake passage 11, the internal pressure downstream of the purge pump 151 in the purge passage 140, that is, the internal pressure P of the second passage 142, becomes a higher pressure as the discharge amount of the purge pump 151 is larger. Thus, in the present embodiment, the predetermined pressure Pg that is a threshold value for determining that the passage end 142a of the second passage 142 deviates from the intake passage 11 is set to a higher pressure as the discharge amount of the purge pump 151 is larger. For this reason, the determination on whether or not the passage end 142a of the second passage 142 deviates from the intake passage 11 can be performed using a suitable threshold value according to the discharge amount of the purge pump 151.

In a case where the passage end 142a of the second passage 142 does not deviate from the intake passage 11, the internal pressure downstream of the flow rate adjusting valve 52 in the purge passage 140, that is, the internal pressure P of the second passage 142, becomes a higher pressure as the opening degree of the flow rate adjusting valve 52 is larger. Thus, in the present embodiment, the predetermined pressure Pg that is a threshold value for determining that the passage end 142a of the second passage 142 deviates from the intake passage 11 is set to a higher pressure as the opening degree of the flow rate adjusting valve 52 is larger. For this reason, the determination on whether or not the passage end 142a of the second passage 142 deviates from the intake passage 11 can be performed using a suitable threshold value according to the opening degree of the flow rate adjusting valve 52.

In addition, the above-described respective embodiments can also be changed and carried out as follows. The opening degree of the flow rate adjusting valve 52 may be adjusted by methods other than the duty control. For example, a flow rate adjusting valve that can change a voltage to be applied to change the opening degree may be adopted.

In the second embodiment, the flow rate adjusting valve 52 may be provided upstream of the purge pump 151 in the first passage 141. In such a form, since the internal pressure P within the second passage 142 is determined according to the amount of discharge from the purge pump 151, it is not necessary to consider the opening degree of the flow rate adjusting valve 52 for the setting of the predetermined pressure Pg to be used for the determination on whether or not the passage end 142a of the second passage 142 deviates from the intake passage 11.

In the first embodiment, Step S120 of the determination processing of FIG. 2 can be skipped. If the supercharging using the supercharger 14 is being performed, an inflow of gas to the intake passage 11 occurs through the inflow passage 60, the ejector 65, and the third passage 43. In a case where the passage end 43a of the third passage 43 does not deviate from the intake passage 11, the internal pressure P of the third passage 43 becomes a high pressure to some extent. For this reason, even if Step S120 of the determination processing of FIG. 2 is skipped, similar to the first embodiment, it can be determined whether or not the passage end 43a of the third passage 43 deviates from the intake passage 11 on the basis of the detection value obtained by the internal pressure sensor 71.

In the second embodiment, by increasing the discharge amount of the purge pump 151, the purge gas can be introduced into the intake passage 11 via the second passage 142 by making the one-way valve 53 open while the purge gas is introduced into the intake passage 11 via the branch passage 45 when the supercharging using the supercharger 14 is not performed. In this form, as long as the discharge amount of the purge pump 151 can be increased to such a degree that detection of the deviation of the passage end 142a of the second passage 142 from the intake passage 11 is possible, Step S110 of the determination processing of FIG. 2 may be skipped.

In the second embodiment, the arrangement position of the purge pump 151 may be changed to an upstream side of the internal pressure sensor 71 in the second passage 142. Also in such a form, since the purge gas can be introduced into the intake passage 11 via the second passage 142 by the driving of the purge pump 151, it is possible to perform determination processing similar to the above-described second embodiment. In addition, when the supercharging using the supercharger 14 is not performed, the one-way valve 54 is made open by the negative pressure generated downstream of the throttle valve 20 of the intake passage 11, and the purge gas is sucked out to the intake passage 11 through the branch passage 45. Therefore, the purge gas can be introduced into the intake passage 11 even if the purge pump 151 is not provided in the first passage 141.

As the predetermined pressure Pg to be used for the detection of the deviation of the passage end of the purge passage 40, 140 from the intake passage 11, a value preset by experiments or the like may be adopted. Since the internal pressure P upstream of the compressor 15 in the intake passage 11 is not greatly different from the atmospheric pressure in any operational state, a pressure difference sensor that detects a pressure difference between the purge passage 40, 140 and the intake passage 11 may be used, as a sensor that detects the internal pressure P downstream of the supply unit in the purge passage 40, 140. That is, when the passage end 43a, 142a of the purge passage 40, 140 is connected to the intake passage 11, the internal pressure P within the purge passage 40, 140 becomes high during the operation of the supply unit, and the pressure difference becomes large. On the other hand, when the passage end 43a, 142a of the purge passage 40, 140 deviates from the intake passage 11, even if the supply unit is being operating, the internal pressure P within the purge passage 40, 140 becomes equivalent to the atmospheric pressure, and the pressure difference becomes small. For that reason, the pressure difference detected by the pressure difference sensor can be used as the detection value of the internal pressure P. In short, the pressure difference sensor functions as a sensor that detects the internal pressure P downstream of the supply unit in the purge passage 40, 140.

The branch passage 45 may be omitted, and the purge gas may be introduced into the intake passage 11 only from a portion upstream of the compressor 15 in the intake passage 11.

What is claimed is:

1. A purge device for mounting on an internal combustion engine including a supercharger, the purge device comprising:
   a canister configured to trap evaporated fuel generated in a fuel tank;
   a purge passage configured to extend from the canister and be connected to an upstream side of a compressor of the supercharger in an intake passage of the internal combustion engine;
   a supply unit configured to supply purge gas within the purge passage to the upstream side of the compressor in the intake passage during supercharging using the supercharger;
   a throttle configured to be provided in a portion of the intake passage connected with the purge passage and limit an inflow of gas from the purge passage;
   a sensor configured to detect internal pressure downstream of the supply unit in the purge passage; and
   a processor configured to determine that a passage end of the purge passage connected to the intake passage deviates from the intake passage, in a case where a detection value obtained by the sensor during the operation of the supply unit is lower than a predetermined pressure, and the processor is configured such that the only deviation of the passage end of the purge passage that the processor determines is the deviation of the passage end of the purge passage connected to the intake passage.

2. The purge device according to claim 1,
   wherein the supply unit is an ejector that is provided in a middle of the purge passage and takes in pressurized gas from a downstream side of the compressor in the intake passage to circulate the pressurized gas to the upstream side of the compressor through the purge passage, and supplies the pressurized gas within the purge passage to the upstream side of the compressor in the intake passage using the pressure of the gas, and
   wherein the predetermined pressure is set to a higher pressure than the previously determined predetermined pressure as the supercharge pressure of the supercharger increases.

3. The purge device according to claim 1,
   wherein the supply unit is a purge pump provided in a middle of the purge passage, and
   wherein the predetermined pressure is set to a higher pressure as the discharge amount of the purge pump is larger.

4. The purge device according to claim 3, further comprising:

a flow rate adjusting valve provided downstream of the purge pump in the purge passage and upstream a site where the sensor is provided, wherein the predetermined pressure is set to a higher pressure as the opening degree of the flow rate adjusting valve is larger.

5. An internal combustion engine comprising:

a supercharger;

a purge device including a canister configured to trap evaporated fuel generated in a fuel tank, a purge passage configured to extend from the canister and be connected to an upstream side of a compressor of the supercharger in an intake passage of the internal combustion engine, a supply unit configured to supply purge gas within the purge passage to the upstream side of the compressor in the intake passage during supercharging using the supercharger, a throttle configured to be provided in a portion of the intake passage connected with the purge passage and limit an inflow of gas from the purge passage, and a sensor configured to detect internal pressure downstream of the supply unit in the purge passage; and a processor configured to determine that a passage end of the purge passage connected to the intake passage deviates from the intake passage, in a case where a detection value obtained by the sensor during the operation of the supply unit is lower than a predetermined pressure, and the processor is configured such that the only deviation of the passage end of the purge passage that the processor determines is the deviation of the passage end of the purge passage connected to the intake passage.

6. The purge device according to claim 1, wherein the only deviation that the processor is configured to determine is the deviation of the passage end of the purge passage connected to the intake passage.

7. The internal combustion engine according to claim 5, wherein the only deviation that the processor is configured to determine is the deviation of the passage end of the purge passage connected to the intake passage.

* * * * *